United States Patent [19]
Miura

[11] Patent Number: 5,534,966
[45] Date of Patent: Jul. 9, 1996

[54] CAMERA IN-FINDER DISPLAY DEVICE

[75] Inventor: Kosho Miura, Kamakura, Japan

[73] Assignee: Nikon Corporation, Tokyo, Japan

[21] Appl. No.: 327,400

[22] Filed: Oct. 21, 1994

[30] Foreign Application Priority Data

Nov. 24, 1993 [JP] Japan .................... 5-293314

[51] Int. Cl.⁶ ..................... G03B 13/18; G03B 17/20
[52] U.S. Cl. ............................... 354/409; 354/474
[58] Field of Search .................. 354/409, 471, 354/474, 475

[56] References Cited

U.S. PATENT DOCUMENTS 4,119,842 10/1978 Hayden et al. ............. 354/475 X
4,557,578 12/1985 Seely ............................. 354/409
4,994,843 2/1991 Kitazawa ........................ 354/409

*Primary Examiner*—W. B. Perkey
*Attorney, Agent, or Firm*—Oliff & Berridge

[57] ABSTRACT

A camera in-finder display device for displaying a selected one of a plurality of areas within a viewfinder regardless of the brightness of the subject or the ambient temperature includes light-emitting display elements and light-darkening display elements. The light-emitting display elements display the selected area by illumination and are driven by a light-emitting display circuit. The light-darkening display elements display the selected area by reducing the amount of light that is guided through said viewfinder and are driven by a light-darkening display driving circuit. A control device for controlling the camera is connected to both of the driving circuits.

36 Claims, 6 Drawing Sheets

CAMERA IN-FINDER DISPLAY DEVICE

BACKGROUND OF THE INVENTION

1. Field of the Invention

The present invention relates to an in-finder display device used to identify the selected one of a plurality of areas in the subject field of a viewfinder.

2. Description of Related Art

Cameras in which one of a plurality of distance measurement areas in the subject field is selected and the photography lens is focused based on the distance measurement information of that selected area are known. With this type of camera, it is necessary to display the selected distance measurement area in the viewfinder. Conventionally, an in-finder display device has been provided to selectively display a mark corresponding to each one of the plurality of distance measurement areas on the viewfinder screen when the subject light is formed into an image. The mark corresponding to the selected distance measurement area displayed in the viewfinder screen overlays the subject image. This type of in-finder display device includes devices that use light-darkening display elements (such as, for example, liquid crystals and electrochromics or similar elements that create black displays on the viewfinder screen by blocking part of the subject light) and devices that use light-emitting display elements (such as LEDs or similar elements that create displays through light illumination).

However, because the light-darkening display elements are normally provided on the viewfinder screen, when an interchangeable viewfinder that does not have the light-darkening display elements is mounted on a camera in which the display of distance measurement areas is performed by light-darkening display elements, it becomes impossible to display the distance measurement areas in the viewfinder. If all interchangeable viewfinders were provided with light-darkening display devices, this problem could be resolved, but this would lead to an increase in cost for interchangeable viewfinders. In addition, light-darkening displays are difficult to see in dark subject fields (for example, during indoor or night photography). Furthermore, the responsiveness of a device that uses liquid crystal elements as the light darkening display is poor at low temperatures.

On the other hand, light-emitting displays that use light-emitting display elements are difficult to see in bright subject fields, and because the display light and the subject image on the viewfinder screen overlap, creating the image can be troublesome.

SUMMARY OF THE INVENTION

It is an object of the present invention to provide a camera in-finder display device in which a selected area within the viewfinder can be easily seen regardless of the brightness of the subject or the temperature.

In order to achieve the above and other objects, and to address the shortcomings set forth above, embodiments of the present invention provide a camera in-finder display device that has a selection device for enabling the selection of one of a plurality of areas in the subject field that displays the selected area in the viewfinder. The image information located in the selected area can be used to perform distance measurement operations, photometry operations, colorimetry operations, etc.

The camera includes a light-emitting display driving circuit that displays the selected area in the viewfinder using illumination light by driving a light-emitting display element. The camera also includes a light-darkening display driving circuit that blocks the subject light that is transmitted to the viewfinder and displays the selected area by driving a light-darkening display element, such as, for example, an LCD, provided in the viewfinder. A control device drives either one or both of the display driving circuits to drive one or both of the light-emitting display element and the light-darkening display element of the selected area.

The camera can also include a photometry device that detects the brightness of the subject field. With such a camera, the light-darkening display driving circuit is driven when the detected brightness of the subject field exceeds a predetermined first value. Alternatively, the light-emitting display driving circuit is driven when the detected brightness of the subject field is less than a predetermined second value.

The camera can include a temperature detection device (i.e., a temperature sensor) that detects the temperature around the camera (i.e., the environmental temperature). In such a camera, the light-emitting display driving circuit is driven when the detected temperature is less than a predetermined temperature.

In addition, the camera can include an operational component, such as, for example, a button, used to drive the selection device so that both the light-emitting display driving circuit and the light-darkening display driving circuit are driven when a photographer actuates the operation component.

The camera can be configured so that a light image is formed by the illuminating light of the light-emitting display element on the outside the periphery of a viewfinder screen in order to identify the selected area.

Because the device is provided with both a light-emitting display driving circuit and a light-darkening display driving circuit, the flaws of either type of display are accounted for by the other, and visibility of the display in the viewfinder is improved regardless of the brightness of the subject or the temperature conditions. Consequently, the photographer can always easily comprehend the selected area.

BRIEF DESCRIPTION OF THE DRAWINGS

The invention will be described in conjunction with the following drawings in which like reference numerals designate like elements and wherein.

DETAILED DESCRIPTION OF PREFERRED EMBODIMENTS

An explanation of a preferred embodiment of the present invention is provided below, with reference to FIGS. 1 through 7.

Figure 2:
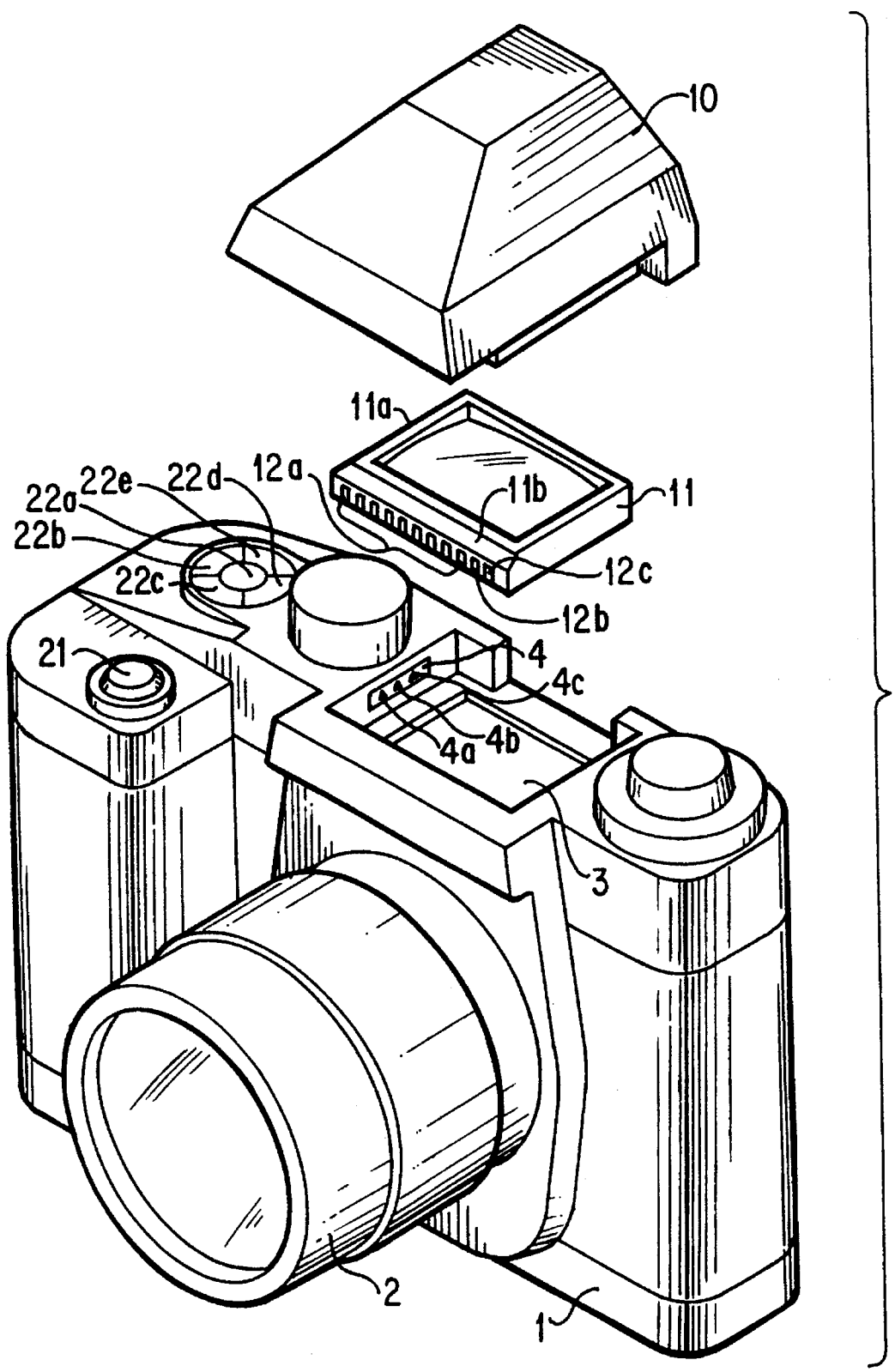
FIG. 2 is an oblique view from the front of a camera having an in-finder display device.
Figure 3:
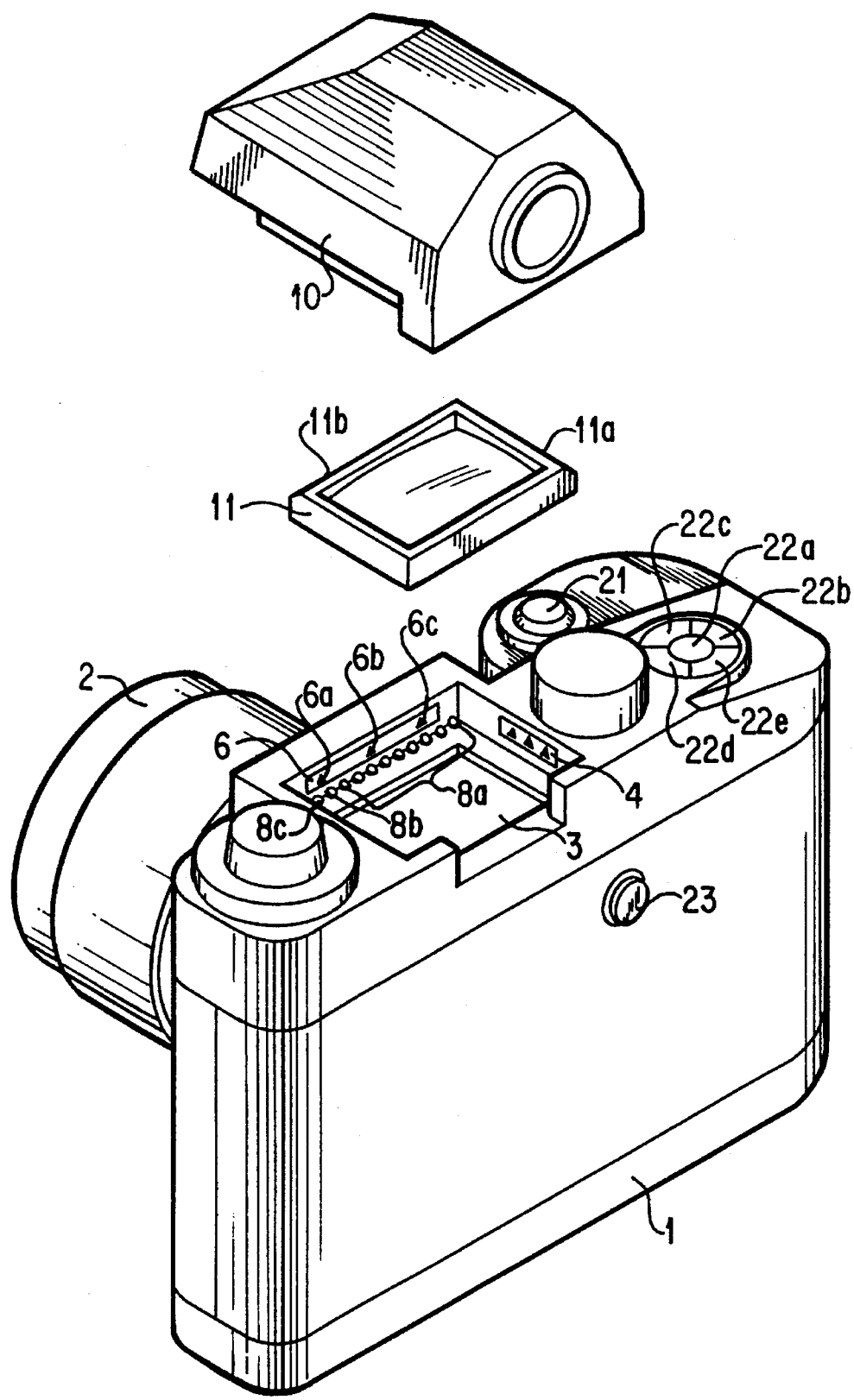
FIG. 3 is an oblique view from the back of a camera having an in-finder display device.

FIGS. 2 and 3 show oblique views from the front and back, respectively, of a camera in-finder display device according to the present invention. A photography lens 2 is mounted on a camera body 1. A finder screen receptacle 3 is formed on the top surface of the camera body 1. A first LED array 4 is attached to the left hand side of the finder screen receptacle 3. The first LED array 4 includes three light-emitting diodes (hereinafter referred to as LEDs) 4a–4c that can be lighted independently of one another. The illuminating light from each of the LEDs 4a–4c is reflected upward by a reflective surface 11a formed in the frame of a finder screen 11. The illuminating light can be viewed along with the subject image through an eyepiece lens via an optical structure in an interchangeable viewfinder body 10. The viewfinder body 10 is removably insertible in the finder screen receptacle 3.

A second LED array 6 is attached to the front wall of the finder screen receptacle 3 (FIG. 3). The second LED array 6 includes three LEDs 6a–6c that can be lighted independently of one another. The illuminating light from each of the LEDs 6a–6c is reflected upward by a reflective surface 11b formed in the frame of the finder screen 11, and can be viewed along with the subject image through the eyepiece lens via the optical structure in the interchangeable viewfinder body 10. The finder screen 11 is mounted within the viewfinder body 10.

Terminals 12b and 12c and a terminal group 12a are disposed on the front surface of the finder screen 11. The terminal group 12a includes a plurality of terminals. Corresponding terminals 8b and 8c and a terminal group 8a are disposed on the front wall of the finder screen receptacle 3. When the viewfinder body 10 is inserted, the electrical system of the viewfinder body 10 and the electrical system of the camera body 1 are connected by the connections between the terminal groups 12a and 8a, between the terminals 12b and 8b, and between the terminals 12c and 8c, respectively. The terminals 12b and 8b include finder screen discrimination terminals. The terminals 12c and 8c are ground terminals.

Figure 1:
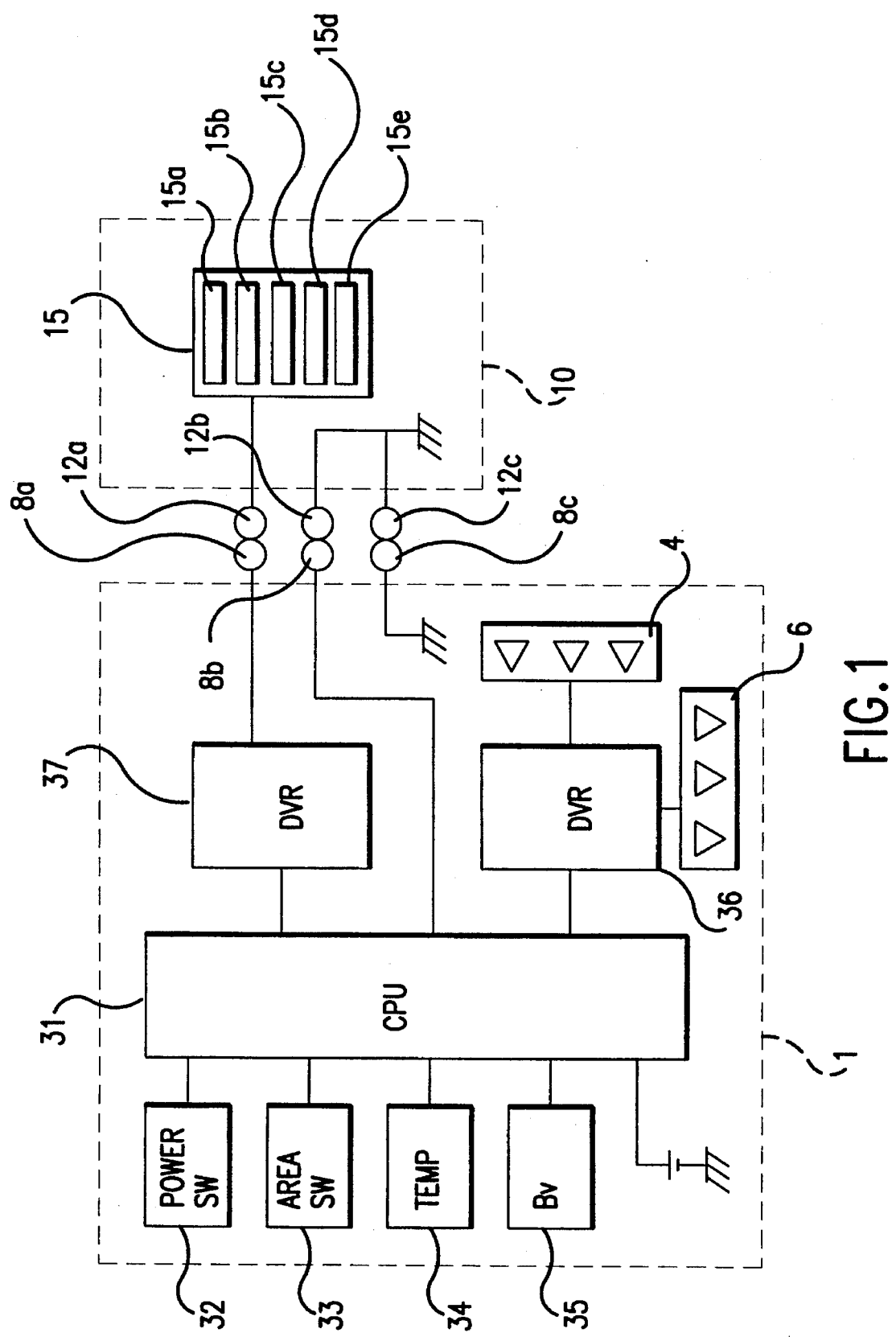
FIG. 1 is a block diagram showing the structure of the camera in-finder display device according to a first embodiment of the present invention.

As shown in FIG. 1, when the viewfinder body 10 is inserted into the finder screen receptacle 3 of the camera body 1, the terminal 8b of the camera body 1 is grounded and falls to a low level. When the viewfinder body 10 is not inserted, this terminal 8b remains at a high level. Accordingly, the CPU 31 of the camera body 1, as explained below, can determine whether a viewfinder body 10 is inserted based upon the state of the terminal 8b.

In addition, a release button 21 and five primary distance measurement area selection buttons 22a–22e are disposed on the top surface of the camera body 1. A secondary distance measurement area selection button 23 is provided on the back surface of the camera body 1. With the present embodiment, one of the five distance measurement areas can be selected by operating one of the five primary distance measurement area selection buttons 22a–22e and the second distance measurement area button 23 simultaneously. In other words, by depressing one of the primary selection buttons 22a–22e while depressing the second selection button 23, a particular distance measurement areas is selected. This two-step process for selecting a distance measurement area prevents inadvertent changing of the desired distance measurement area.

FIG. 1 shows the control system of the camera body 1 and the viewfinder body 10. A control circuit (hereinafter referred to as the CPU) 31 is provided within the camera body 1 to control the operation of the camera. The CPU 31 is connected to: a power source switch detection circuit 32 that detects when a power source switch (not shown) is turned "on" or "off"; a distance measurement area switch detection circuit 33 that detects the operation or lack of operation of the five primary distance measurement area selection buttons 22a–22e and the secondary distance measurement area selection button 23; a temperature detection circuit 34 that detects the temperature in the area around the camera; and a photometry circuit 35 that detects the brightness of the subject. Detection signals from each of these circuits are transmitted to the CPU 31.

In addition, the CPU 31 is connected to a light-emitting driver circuit 36 for the LEDs 4a–4c and 6a–6c that comprise the first LED array 4 and the second LED array 6, respectively. The CPU 31 is also connected to a LCD driver circuit 37 for a liquid crystal display device (hereinafter referred to as the LCD) 15 disposed within the viewfinder body 10. When the viewfinder body 10 is attached to the camera body 1, the terminal groups 8a and 12a as described above are connected and the LCD driving signals (voltage signals) from the LCD light-darkening driver circuit 37 can be applied to the LCD 15.

Figures 4, 5:
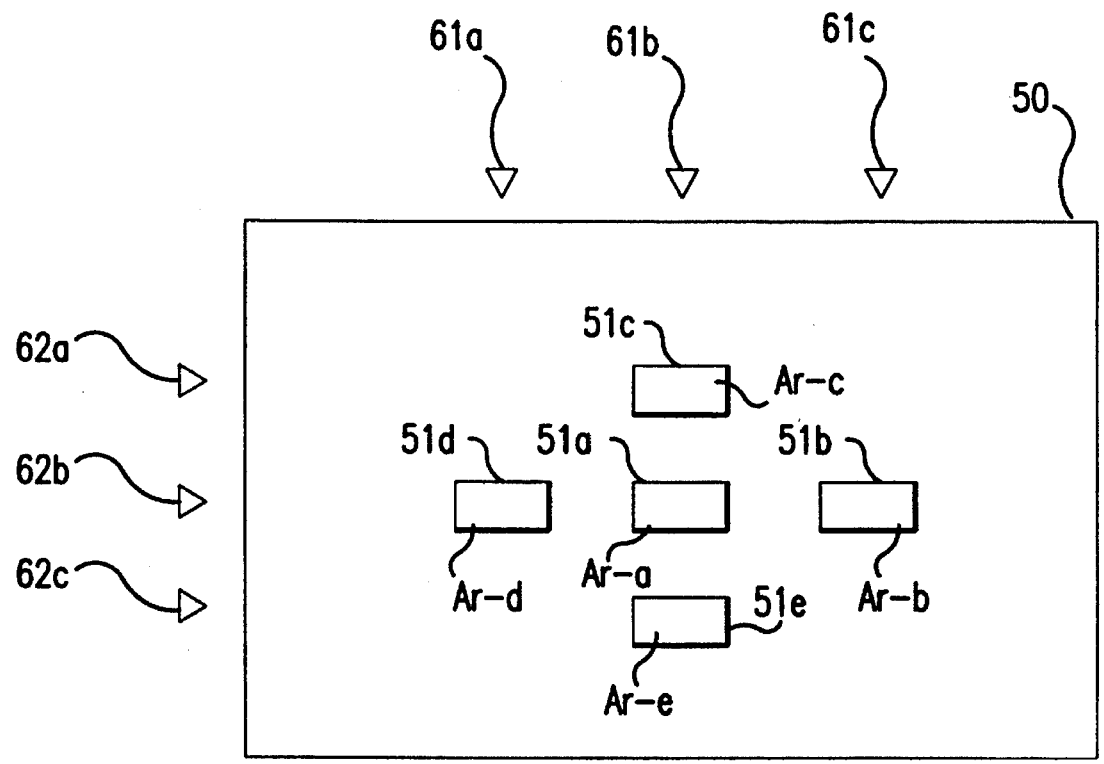
FIG. 4 is a schematic view of the distance measurement areas in the viewfinder screen and their method of display.
FIG. 5 is a table showing the on or off state of the LEDs and LCDs relative to the operation of the distance measurement area selection buttons.

As shown in FIG. 4, the LCD 15 displays on the viewfinder screen which one of the five distance measurement areas Ar-a to Ar-e (the area in the center of the screen and the four areas above, below, right and left of it) is selected. The LCD is comprised of five liquid crystal blocks 15a–15e (FIG. 1) positioned near the viewfinder screen in accordance with each of the distance measurement areas Ar-a through Ar-e. By applying voltage to these liquid crystal blocks 15a–15e, the frames 51a–51e that surround each of the distance measurement areas can be displayed independently on the viewfinder screen.

In other words, when voltage is applied to one of the LCDs 15a–15e from the LCD driver circuit 37, the LCD darkens (e.g., turns black) and the subject light in the area is blocked, thereby projecting one of the frames 51a–51e onto the viewfinder screen. When the voltage is removed, the LCD becomes transparent and the frame is removed from the viewfinder screen. In the explanation that follows, applying voltage to the LCD driving circuit 37 for the purpose of displaying a frame is referred to as "turning on" the LCD, and removing the applied voltage for the purpose of removing a frame is referred to as "turning off" the LCD.

In FIG. 1, a viewfinder is shown in which an LCD 15 is built-in for use in creating displays on the viewfinder. However, viewfinders without this type of LCD 15 also exist. On the outside of the viewfinder screen 50 in FIG. 4, optical images 61a–61c from LEDs 6a–6c are displayed along the top of the screen 50, while optical images 62a–62c from LEDs 4a–4c are displayed along the left of the screen 50. The spacing between each of the LEDs 4a–4c and 6a–6c is predetermined such that the spacing between the three optical images 61a–61c in the horizontal direction is basically the same as the spacing between the distance measurement areas Ar-d, Ar-a and Ar-b, and such that the spacing between the three optical images 62a–62c in the vertical direction is basically the same as the spacing between the distance measurement areas Ar-c, Ar-a and Ar-e. Furthermore, the distance measurement areas Ar-a through Ar-e are indicated and displayed by selecting one of the optical images 61a–61c in the horizontal direction and one of the optical images 62a–62c.

FIG. 5 is a table showing the "on" or "off" state of the LEDs 4a–4c and 6a–6c and the LCDs 15a–15e relative to the primary distance measurement area selection buttons 22a–22e. A "1" in the table indicates the "on" state and a "0" indicates the "off" state. For example, when the first distance measurement area selection button 22a is depressed in order to select distance measurement area Ar-a the LEDs 4b and 6b are turned on (optical images 61b and 62b are displayed) and/or the LCD 15a is turned on (frame 51a is displayed). Furthermore, when the primary distance measurement area selection button 22e is depressed in order to select distance measurement area Ar-e, for instance, LEDs 4c and 6b are turned on (optical images 61b and 62c are displayed) and/or LCD 15e is turned on (frame 51e is displayed).

Figure 6:
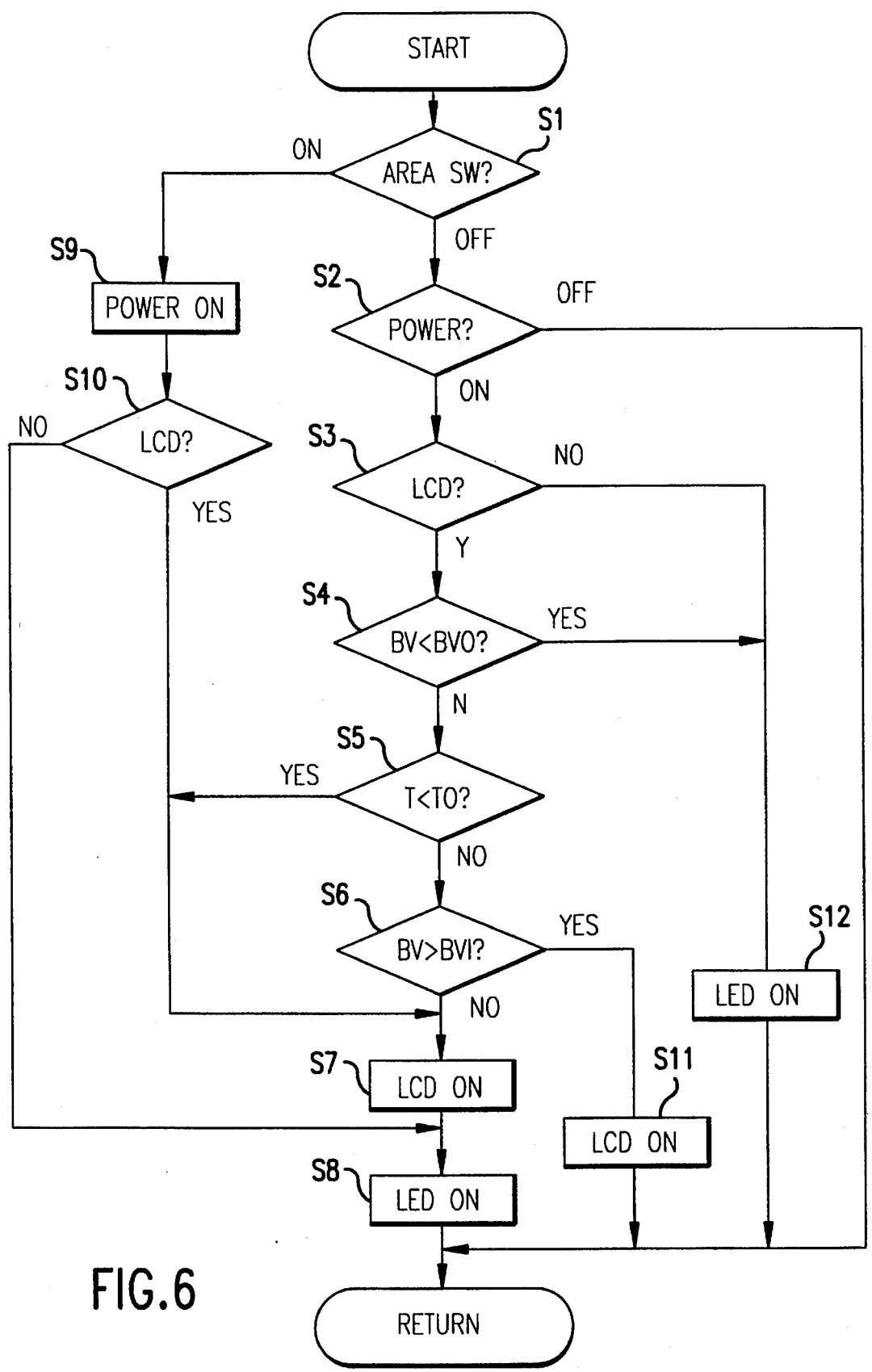
FIG. 6 is a flowchart showing the in-finder display control procedure.

FIG. 6 depicts the viewfinder display control procedure that is performed by the CPU 31. This program is periodically called by the main routine while the power source of the camera is on. In step S1, a determination is made from the output of the distance measurement area switch detection circuit 33 as to whether the secondary distance measurement area selection switch (i.e., the switch that is turned on with the operation of the secondary distance measurement area selection button 23) is on, in which case the CPU advances to step S9 and supplies power to each of the circuits shown in FIG. 1.

In step S10, a determination is made as to whether a viewfinder with a built-in LCD 15 has been attached to the camera. This can be determined by whether the connection group 8a of the camera body 1 is in contact with the connection group 12a of the finder screen 11. If the condition in step S10 is affirmative, the CPU advances to step S7 and one of the LCDs 15a–15e is turned on according to the chart in FIG. 5 in order to perform an LCD display in the currently selected distance measurement area. For instance, in order to display distance measurement area Ar-a, LCD 15a is turned on. In step S8, one of each of the LEDs 4a–4c and 6a–6c is turned on according to the chart in FIG. 5 in order to display the optical images 61a–61c and 62a–62c corresponding to the currently selected distance measurement area, and the CPU then returns to the main routine. For instance, LEDs 4b and 6b are turned on in order to display distance measurement area Ar-a. When a determination is made in step S10 that the viewfinder without an LCD has been mounted, however, the CPU advances directly to step S8.

Subsequently, a distance measurement area selection process is performed using a known routine (not shown). For instance, when one of the primary distance measurement area selection buttons 22a–22e is depressed while the secondary distance measurement area selection button 23 is depressed, the distance measurement area corresponding to the depressed button is selected.

If in step S1 the CPU determines that the secondary distance measurement area selection switch is off, the CPU advances to step S2 and a determination is made as to whether power is being supplied to each of the circuits shown in FIG. 1. When the determination is negative, the CPU returns, but when the determination is affirmative, the CPU advances to step S3. In step S3, a determination is made as to whether a viewfinder with a built-in LCD 15 has been attached; if the determination is negative, the CPU executes the same process in step S12 as described above in connection with step S8. In other words, an LED display is performed and then the program returns. (In this case, an LCD display is not performed.)

When a determination is made in step S3 that a viewfinder with a built-in LCD 15 has been mounted, the CPU advances to step S4 and a determination is made as to whether the subject brightness BV input from the photometry circuit 35 is darker than a first predetermined value BV0. When the subject brightness is darker, the CPU advances to step S12 as described above, performs an LED display, and then returns. If, on the other hand, the subject brightness BV is at least as great as the preset value BV0, the CPU advances to step S5 and a determination is made as to whether the temperature T around the camera as detected by the temperature detection circuit 34 is less than a predetermined temperature T0. If the temperature T is less than the predetermined temperature, the CPU performs the LCD display in step S7 and the LED display in step S8 and then returns.

In addition, when it is determined in step S5 that the temperature T is at least as great as the predetermined temperature T0, the CPU advances to step S6 and a determination is made as to whether the subject brightness BV is brighter than a second predetermined value BV1 (BV1 being greater than BV0). If the subject brightness BV is not greater than the preset value BV1, the CPU advances to step S7; if BV is greater than the preset value BV1, the CPU advances to step S11 where it performs the same process as in step S7. In other words, it performs a display process using the LCD, and then returns. (When the result of step S6 is affirmative, a LED display is not performed.)

Figure 7:
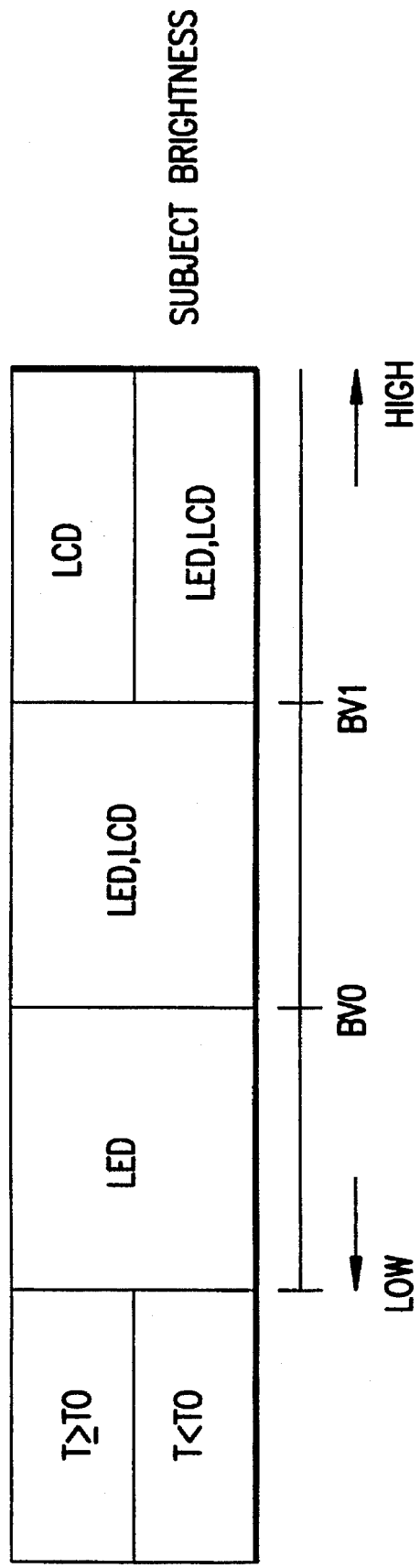
FIG. 7 is a table showing the in-finder display state under various conditions."

In the above procedure, when the secondary distance measurement area selection button 23 is depressed in order to select the distance measurement area, the currently selected distance measurement area is displayed by both LED and LCD. After one of the first distance measurement area selection buttons 22a–22e is depressed while the secondary distance measurement area selection button 23 is maintained in the depressed position, the selected distance measurement area is displayed by at least either the LED or LCD, as shown in FIG. 7.

With respect to the display state, when the subject brightness BV is less than the first predetermined value BV0, the display is performed using only LEDs, regardless of the temperature around the camera. Accordingly, even when the subject is dark and it is difficult to verify the distance measurement area using an LCD display, the distance measurement area can easily be verified using a display of optical images from the LEDs. In addition, there is no unnecessary drain on the power source battery because a display using the LCD is not performed. When the subject brightness is at least as great as the first predetermined value BV0 but less than a second predetermined value BV1, however, displays using both LED and LCD are performed regardless of the temperature around the camera. Accordingly, when it is difficult to verify the distance measurement area using an LED display, verification is easy using the LCD display. Conversely, when it is difficult to verify the distance measurement area using an LCD display, verification according to the LED display is easy.

Furthermore, when the subject brightness exceeds the second predetermined value BV1 and the temperature T around the camera is at least as great as the predetermined temperature T0, the display is performed using only the LCD. Accordingly, when the subject is bright and it is difficult to verify the distance measurement area using an LED display, the distance measurement area can easily be verified using an LCD display. Moreover, there is no unnecessary drain on the power source battery because a display using the LEDs is not performed. In addition, when the subject brightness exceeds the second predetermined value BV1 while the temperature T around the camera is less than the predetermined temperature T0, display using both the LED and LCD is performed. Accordingly, even when the LCD responsiveness is poor because of a low ambient temperature, the distance measurement area can be verified, although somewhat less visibly, by using an LED display.

Moreover, in the cases referred to above, because the display procedure is performed using both LEDs and LCDs when the second distance measurement area selection button is being operated, i.e., while the distance measurement area selection operation is underway, the operator of the camera can positively verify the current distance measurement area during area selection under all conditions.

With the structure (and its equivalents) according to the present embodiment, the LEDs 4a–4c and 6a–6c function as light-emitting display elements; the CPU 31 and light-emitting driver circuit 36 function as a light-emitting display driving means; the LCDs 15a–15e function as light-darkening display elements; the CPU 31 and the light-darkening driver circuit 37 function as a light-darkening display driving means; the CPU 31 functions as a selection means and as a control means; the photometry circuit functions as a photometry means; the temperature detection circuit 34 functions as a temperature detection means; and the first and second buttons 22 and 23 function as an operational component.

An example of performing a light-emitting display outside the screen is described above, but it would also be appropriate to perform this display within the screen. Moreover, LEDs were used as the light-emitting display elements, but it would also be appropriate to use, e.g., a lamp or similar device. Similarly, an LCD was used as the light-darkening display element, but it would also be appropriate to use, e.g., an electrochromic element instead.

The number, positioning, and type of areas that can be selected is not limited by the disclosed embodiment. For the purposes of illustration, the present invention is described above as relating to the display of a selected one of a number of areas which are used to gather data for use in a distance measurement procedure. The present invention, however, can display areas used to gather data for photographic operations other than distance measurement, including photometry, and colorimetry. Accordingly, the present invention may be used to perform photometry area display and colorimetry area display, as well as distance measurement area display.

In addition, both the light-emitting display elements and the light-darkening display elements can be driven during the operation of an operational component used to select the distance measurement area. Therefore, the photographer can always positively verify the current distance measurement area during area selection under all conditions.

Furthermore, the light-emitting display element is positioned so that an optical image is formed by its illuminating light on the outside of the viewfinder screen in order to indicate the distance measurement area. Therefore, there is no overlap between the display light and the subject image on the screen, thereby making the subject image more readily discernible.

While this invention has been described in conjunction with specific embodiments thereof, it is evident that many alternatives, modifications and variations will be apparent to those skilled in the art. Accordingly, the preferred embodiments of the invention as set forth herein are intended to be illustrative, not limiting. Various changes may be made without departing from the spirit and scope of the invention as defined in the following claims.

What is claimed is:

1. A camera in-finder display device that displays a selected one of a plurality of areas within a viewfinder, comprising:

light-emitting display elements and light-darkening display elements that display said selected area in a viewfinder, said light-emitting display elements displaying said selected area by illumination, said light-darkening display elements displaying said selected area by reducing an amount of light that is transmitted through said selected area; and control means for selectively activating said light-emitting display elements and said light-darkening display elements based on operating conditions, wherein in a first mode one of said light-emitting display elements and said light-darkening display elements is activated, and wherein in a second mode said light-emitting display elements and said light-darkening display elements are activated.

2. The device according to claim 1, wherein said selected area is one of a plurality of distance measurement areas, and further comprising means for selecting said one of said plurality of areas as a distance measurement area.

3. The device according to claim 1, further comprising photometry means for detecting a subject field brightness value of a subject field transmitted through said viewfinder, wherein said control means selectively activates at least one of said light-darkening and said light-emitting display elements based on said subject field brightness value output of said photometry means.

4. The device according to claim 3, wherein said control means activates said light-darkening display elements when said subject field brightness value exceeds a first predetermined value.

5. The device according to claim 3, wherein said control means activates said light-emitting display elements when said subject field brightness value is less than a second predetermined value.

6. The device according to claim 4, wherein said control means activates said light-emitting display elements when said subject field brightness value is less than a second predetermined value.

7. The device according to claim 1, wherein said light-darkening display elements include a liquid crystal display.

8. The device according to claim 1, wherein said light-emitting display elements include light-emitting diodes.

9. The device according to claim 1, further comprising temperature detection means for detecting a temperature in the area surrounding said camera, wherein said control means controls said light-emitting elements and said light-darkening elements based on the temperature detected by said temperature detection means.

10. The device according to claim 9, wherein said control means activates said light-emitting elements when said temperature is less than a predetermined temperature.

11. The device according to claim 1, further comprising an operation component, wherein said control means simultaneously activates said light-emitting display elements and said light-darkening display elements in said second mode when a photographer actuates said operation component.

12. The device according to claim 1, wherein said light-emitting display elements are disposed outside a periphery of a screen within said viewfinder such that said illumination from said light-emitting display elements is reflected by a reflective surface attached to said screen in a direction through said viewfinder toward an eye of a photographer, thereby indicating said selected area.

13. The device according to claim 1, wherein said control means includes selection means for selecting said selected area from a plurality of areas within said viewfinder.

14. The device according to claim 1, wherein said control means includes driving circuits, said driving circuits being connected to said light-emitting display elements and to said light-darkening display elements.

15. A camera in-finder display device comprising:

a screen having a plurality of areas;

light-emitting display elements that can be selectively activated to identify a selected one of said plurality of areas by illumination;

light-darkening display elements that can be selectively activated to identify said selected one of said plurality of areas by reducing an amount of light that is transmitted through said screen; and a controller connected to said light-emitting display elements and to said light-darkening display elements, said controller selectively activating said light-emitting display elements and said light-darkening display elements based on operating conditions, wherein in a first mode one of said light-emitting display elements and said light-darkening display elements is activated, and wherein in a second mode said light-emitting display elements and said light-darkening display elements are activated.

16. The device according to claim 15, further comprising a photometry device that detects a subject field brightness value of a subject field that can be viewed through said screen, wherein said controller controls said light-emitting display elements and said light-darkening display elements based on said subject field brightness value.

17. The device according to claim 16, wherein said controller activates said light-darkening display elements when said subject field brightness value exceeds a first predetermined value.

18. The device according to claim 17, wherein said controller activates said light-emitting display elements when said subject field brightness value is less than a second predetermined value.

19. The device according to claim 15, wherein said controller activates said light-emitting display elements when said subject field brightness value is less than a second predetermined value.

20. The device according to claim 15, wherein said light-darkening display elements include a liquid crystal display.

21. The device according to claim 15, wherein said light-emitting display elements include a plurality of light-emitting diodes.

22. The device according to claim 15, further comprising a temperature sensor that detects a temperature in an area surrounding said camera, wherein said controller controls said light-emitting display elements and said light-darkening display elements based on the detected temperature.

23. The device according to claim 22, wherein said controller activates said light-emitting elements when said temperature is less than a predetermined temperature.

24. The device according to claim 15, further comprising an operation component, wherein said controller activates said light-emitting display elements and said light-darkening display elements in said second mode when a photographer actuates said operation component.

25. The device according to claim 15, wherein said light-emitting display elements are disposed outside a periphery of said screen, said screen provided within a viewfinder such that said illumination from said light-emitting display elements is reflected by a reflective surface of said screen in a direction through said viewfinder toward an eye of a photographer, thereby indicating said selected area.

26. The device according to claim 15, wherein said controller includes a selection device for specifying said selected area from said plurality of areas within screen viewfinder.

27. A method of displaying a selected area within a viewfinder of a camera, said camera having a controller connected to light-emitting display elements and light-darkening display elements, said method comprising the steps of:

detecting operating conditions and conveying said operating conditions to said controller; and displaying said selected area by selectively activating said light-emitting display elements and said light-darkening display elements with said controller based on said operating conditions, wherein in a first mode one of said light-emitting display elements and said light-darkening display elements is activated, and wherein in a second mode said light-emitting display elements and said light-darkening display elements are activated.

28. The method of claim 27, further comprising:

detecting a brightness value of a photographic subject, said step of activating being performed based on said detected brightness value.

29. The method of claim 27, further comprising:

detecting a temperature in a vicinity of said camera, said step of activating being performed based on said detected temperature.

30. The method of claim 27, wherein said selected area is used to identify a portion of a subject image by which to perform a distance measurement operation.

31. The method of claim 28, wherein said light-darkening display elements are activated when said brightness value exceeds a first predetermined value.

32. The method of claim 31, wherein said light-emitting display elements are activated when said brightness value is less than a second predetermined value.

33. The method of claim 28, wherein said light-emitting display elements are activated when said brightness value is less than a second predetermined value.

34. The method of claim 29, wherein said light-emitting display elements are activated when said detected temperature is less than a predetermined temperature.

35. The method of claim 27, wherein said light-emitting display elements and said light-darkening display elements are simultaneously activated in said second mode when a photographer actuates an operation component of said camera.

36. The method of claim 27, wherein said light-emitting display elements illuminate a periphery of a screen within said viewfinder by reflecting light from a reflective surface provided on said screen, thereby indicating said selected area.

* * * * *